United States Patent [19]

Barnabeo

[11] Patent Number: 5,237,014

[45] Date of Patent: Aug. 17, 1993

[54] TREE RESISTANT COMPOSITIONS

[75] Inventor: Austin E. Barnabeo, Bridgewater, N.J.

[73] Assignee: Union Carbide Chemicals & Plastics Technology Corporation, Danbury, Conn.

[21] Appl. No.: 349,406

[22] Filed: May 8, 1989

[51] Int. Cl.$^5$ .............................................. C08F 8/34
[52] U.S. Cl. .................................. 525/291; 428/447; 428/522; 428/523
[58] Field of Search .......................................... 525/291

[56] References Cited

U.S. PATENT DOCUMENTS 3,284,541 11/1966 Stanton et al. ...................... 525/291
4,224,210 9/1980 Cazzaro et al. ..................... 525/291
4,600,521 7/1986 Nakamura et al. ................. 525/291

FOREIGN PATENT DOCUMENTS 61-16206 9/1981 Japan ................................... 525/291

Primary Examiner—Ralph H. Dean, Jr.
Attorney, Agent, or Firm—Saul R. Bresgh

[57] ABSTRACT

A water tree resistant composition comprising: (a) a thermoplastic resin; grafted with (b) 2-acrylamido-2-methylpropanesulfonic acid.

8 Claims, No Drawings

TREE RESISTANT COMPOSITIONS

TECHNICAL FIELD

This invention relates to compositions which are useful in low to high voltage insulation because of their resistance to water trees.

BACKGROUND ART

Power cables insulated with extruded dielectrics are known to suffer from shortened life when installed underground where water contact is likely. The shortened life has been attributed to the formation of water trees, which occur when an organic polymeric material is subjected to an electrical field over a long period of time in the presence of water in liquid or vapor form. The net result is a reduction in the dielectric strength of the insulation.

Many solutions have been proposed for increasing the resistance of organic insulating materials to degradation by water treeing. These include, for example, the addition to polyethylene of (i) a polar copolymer such as a copolymer of ethylene and vinyl acetate; (ii) a voltage stabilizer such as dodecanol; and (iii) a filler, e.g., clay. These solutions all have shortcomings of some kind such as an increase in dielectric loss, i.e., the power factor, volatility, or cost.

DISCLOSURE OF THE INVENTION

An object of this invention, therefore, is to provide a water tree resistant composition adapted for use in low to high voltage insulation, which, not only avoids the aforementioned deficiencies, but lowers the water tree growth rate to an extent heretofore unattainable.

Other objects and advantages will become apparent hereinafter.

According to the present invention, the above object is met by a water tree resistant composition comprising:
a) a thermoplastic resin; and
b) a compound having the following formula:

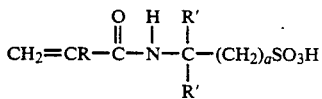

wherein
R=H or $CH_3$
R'=$CH_3$ or $C_2H_5$, and each R' can be alike or different
a=an integer from 1 to 4

DETAILED DESCRIPTION

The thermoplastic resin can be any homopolymer or copolymer based on two or more comonomers, or a blend of two or more of these polymers, conventionally used as jacketing and/or insulating materials in wire and cable applications. Generally, the monomers useful in the production of these homopolymers and copolymers will have 2 to 20 carbon atoms. Examples of such monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t butyl acrylate, n-butyl acrylate, n-butyl methacrylate, 2-thlyhexyl acrylate, and other aklyl acrylates; diolefins such as 1,4-pentadiene, 1,3-hexadiene, 1,5-hexadiene, 1,4-octadiene, and ethylidene norbornene; other monomers such as styrene, p methyl styrene, alpha-methyl styrene, p chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, tetrafluoroethylene, and chlorotrifluoroethylene; and acrylic acid, methacrylic acid, and other similar unsaturated acids.

The thermoplastic resin can be, for example, a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and a hydrolyzable silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate /hydrolyzable silane terpolymer; and ethylene/ethyl acrylate or vinyl acetate copolymers having a hydrolyzable silane grafted to their backbones. Preferred thermoplastic resins have a major proportion based on ethylene. The portion of the copolymer attributed to comonomers, other than ethylene, is in the range of about 2 to about 49 percent by weight based on the weight of the copolymer and is preferably in the range of about 2 to about 40 percent by weight. The homopolymers or copolymers can be crosslinked or cured with an organic peroxide, or they can be grafted with a vinyl trialkoxy silane to make them hydrolyzable in the presence of an organic peroxide, which acts as a free radical generator or catalyst. Useful vinyl trialkoxy silanes include vinyl trimethoxy silane, vinyl triethoxy silane, and vinyl triisopropoxy silane. Among the most useful organic peroxides are dicumyl peroxide, lauroyl peroxide, benzoyl peroxide, tertiary butyl perbenzoate, di(tertiary-butyl) peroxide, cumene hydroperoxide, 2-5-dimethyl-2,5 -di(t-butyl peroxy) hexyne, 2,5-dimethyl 2,5-di(t-butyl-peroxy)-hexane, and tertiary butyl hydroperoxide. Hydrolyzable silane grafted polymers can also be crosslinked by moisture in the presence of a conventional silanol condensation catalyst such as dibutyl tin dilaurate, dioctyl tin maleate, stannous acetate, and stannous octoate. About 0.01 to about 5 percent by weight of free radical generator based on the weight of the polymer is used, and preferably about 0.05 to about 0.25 percent by weight. The amount of organic peroxide used for cross linking is in the range of about 0.5 to about 5 percent by weight based on the weight of the copolymer.

High pressure homopolymers of ethylene are made by a technique describe in Introduction to Polymer Chemistry, Stille, Wiley and Sons, New York, 1982, at pages 149 to 153. The ethylene/silane copolymer can be prepared by the process described in U.S. Pat. No. 3,225,108 and the terpolymer by the process described in U.S. Pat. No. 4,291,136. The ethylene/alpha olefin copolymer can be prepared as described in European Patent Application 012050 published on Oct. 3, 1984. This process uses a vanadium based catalyst. Ethylene/alpha olefin copolymers can also be made in accordance with the disclosure of U.S. Pat. No. 4,011,382 or as described in U.S. Pat. No. 4,302,565.

A typical procedure for preparinq a silane qrafted polyethylene follows: 100 parts of ethylene/1-butene copolymer having a density of 0.90, 0.2 part of polymerized 1,3-dihydro-2,2,4-trimethyl-quinoline (an antioxidant), 0.1 part of dicumyl peroxide, and 4 parts of vinyl tri-2-ethyl-hexoxy silane are mixed in a laboratory Brabender mixer at a temperature in the range of about 80° C. to about 115° C., a temperature low enough to keep the dicumyl peroxide below its decomposition temperature. After mixing for five minutes, the temperature is raised to a temperature in the range of about 150° C. to about 220° C. The batch is then mixed for 5 to 10 minutes during which grafting of the silane to the copolymer occurs. The antioxidant is used as a radical trap to control the amount of cross-linking. The foregoing technique can be repeated, for example, with 3 parts of vinyl triisobutyoxy silane and 0.1 part of the antioxidant, tetrakis[methylene (3-5-di-tert-butyl-4-hydroxyhydro-cynnamate)] methane or, alternatively, thiodiethylene bis-(3,5-di-tert-butyl-4-hydroxy) hydrocinnamate; initial mixinq is in the range of 110° C. to 120° C.; grafting is for five minutes at 185° C.

Various processes for preparing silane grafted polyethylene and ethylene/silane copolymers and numerous unsaturated silanes suitable for use in preparing these polymers and bearing hydrolyzable groups such a alkoxy, oxy aryl, oxyaliphatic, and halogen are mentioned in U.S. Pat. Nos. 3,075,948; 3,225,018; 4,412,042; 4,413,066; 4,574,133; and 4,593,071.

Various blends of homopolymers and/or copolymers can be used to provide the thermoplastic resin, a particularly preferred blend being a blend comprised of an ethylene/hydrolyzable silane copolymer and an ethylene/ethyl acrylate/hydrolyzable silane terpolymer. A two component blend of homopolymers and copolymers can be blended in a weight ratio of about 1:9 to about 9:1 and preferably in a weight ratio of about 7:3 to about 3:7.

Preferred thermoplastic resins have densities in the range of about 0.88 to about 0.93 gram per cubic centimeter and melt indices in the range of about 1 to about 5 grams per 10 minutes.

Component (b) is a compound having the following formula:

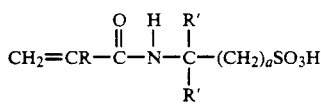

wherein
R=H or $CH_3$
R'=$CH_3$ or $C_2H_5$, and each R' can be alike or different
a=an integer from 1 to 4

A preferred sulfonic acid is 2-acrylamido-2-methyl-propanesulfonic acid. The structural formula for this sulfonic acid is as follows:

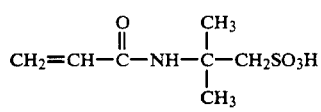

The sulfonic acid can be present in the composition in an amount of about 0.1 to about 4 parts by weight per 100 parts by weight of thermoplastic resin and preferably in an amount of about 0.25 to about 2 parts by weight.

Various conventional additives can be added in conventional amounts to subject composition. Typical additives are antioxidants, ultraviolet absorbers, antistatic agents, piqments, slip agents, fire retardants, stabilizers, cross-linkinq agents, haloqen scavengers, smoke inhibitors, cross-linkinq boosters, processing aids, lubricants, plasticizers, and viscosity control agents.

Subject composition is typically used in the form of an insulating layer coated on or extruded about an electrical conductor. The hydrolyzable composition is generally cross linked after it is in place on the wire.

The patents, patent applications, and other publications mentioned in this specification are incorporated by reference herein.

The invention is illustrated by the following examples.

EXAMPLE 1

The resistance of insulating compositions to water treeing is determined by the method described in U.S. Pat. No. 4,144,202. This measurement leads to a value for water treeing resistance relative to a standard polyethylene insulating material. The term used for the value is "water tree growth rate" (WTGR). From experience in laboratory tests of materials and for accelerated tests of cables, it has been established that the value for WTGR should be equal to or less than about 10 percent of the standard to provide a useful improvement in cable performance, i.e., in the life of a cable which is in service and in contact with water during the period of service.

100 grams of a high pressure low density polyethylene having a melt index of 2 and a density of 0.92 gram per cubic centimeter (g/cc) and 0.1 gram of an antioxidant, thiodiethylene bis-(3,5-ditert-butyl-4-hydroxy) hydrocinnamate, are placed in a Brabender mixer operating at 50 revolutions per minute (rpm) and a temperature of 130° C., and fluxed for two minutes. At the end of the two minute period, 0.5 gram of 2-acrylamido-2-methylpropane-sulfonic acid (AMPSA) and 0.1 gram of an organic peroxide, dicumyul peroxide, to graft AMPSA to the polymer are added to the Brabender mixer and mixing is continued for another two minutes. The contents of the Brabender mixer are heated to 190° C. and maintained at this temperature for five minutes. The composition is then removed from the Brabender mixer and molded into plaques having dimensions of 3½ inches by 3½ inches by 0.075 inch in a press in two steps:

|  | initial step | final step |
| --- | --- | --- |
| pressure (psi) | 200 | 5000 |
| temperature (°C.) | 130 | 130 |
| residence time (minutes) | 7 | 3 |

The sample is tested for WTGR and the results compared with a control:

|  | weight % AMPSA | WTGR (%) |
| --- | --- | --- |
| control | 0.0 | 100 |
| Example 1 | 0.5 | <1 |

The weight percent of AMPSA is based on the weight of the polymer.

EXAMPLE 2

Example 1 is repeated except that one gram of AMPSA is used. The WTGR is found to be less than 1 percent.

EXAMPLE 3

Example 2 is repeated except that an ethylene/1-butene copolymer having a melt index of 1.2 and a density of 0.88 g/cc is used. The WTGR is less than 1 percent.

EXAMPLE 4

Example 3 is repeated except that the copolymer has a melt index of 1.0 and a density of 0.89 g/cc. The WTGR is less than 1 percent.

EXAMPLE 5

Example 3 is repeated except that the copolymer has a melt index of 0.8 and a density of 0.905 g/cc. The WTGR is less than 1 percent.

EXAMPLE 6

Example 2 is repeated except the 0.18 gram of the antioxidant is used as well as 0.18 gram of another antioxidant, distearylthiopropionate; the organic peroxide level is 2 grams; and 0.7 gram of triallylcyanurate is added as a cure booster. The composition is cured and the rheometer reading in inch-pounds for the cured sample is 47. The WTGR is less than 1 percent. Rheometer measurements are made according to the procedure set forth in ASTM-D-2084-71T.

EXAMPLE 7

Example 6 is repeated except that ethylene/vinyl trimethoxy silane copolymer (VTMS) having a melt flow of 1.5 and a VTMS content of 1.5 percent by weight based on the weight of the copolymer is used. The composition is heated to 160° C. for 10 minutes adding 0.07 gram of dibutyltindilaurate during the last minute. A plaque is then placed in a water bath at 70° C. for 16 hours. The water treated plaque has a rheometer reading of 52 inch-pounds as compared to 8 inch-pounds for an untreated sample. The WTGR for the treated sample is less than 1 percent as compared to 40 percent for the control sample prepared in the same manner, but without AMPSA.

EXAMPLE 8

Example 7 is repeated except that an ethylene/ethyl acrylate/VTMS terpolymer having a melt index of 2.0 and a VTMS content of 1.5 percent by weight based on the weight of the terpolymer is used. The uncured plaque has a rheometer reading (cure level) of 11 inch-pounds. Moisture cure raises the rheometer reading to 51 inch-pounds. The WTGR is found to be less than 1 percent. The control (without AMPSA) is 5 percent.

EXAMPLE 9

Example 7 is repeated except that a 2:1 (weight ratio) blend of ethylene/VTMS copolymer and ethylene/ethyl acrylate/VTMS terpolymer is used. The WTGR is less than 1 percent.

I claim:

1. An electrical conductor insulated with
(a) a homopolymer of ethylene;
  a copolymer of ethylene and one or more of C3 or higher alpha-olefins, unsaturated esters, and hydrolyzable silanes;
  a crosslinkable hydrolyzable silane grafted homopolymer of ethylene or copolymer of ethylene and one or more of C3 or higher alpha-olefins and unsaturated esters; or
  mixtures thereof; and
(b) grafted to component (a), a compound having the following formula;

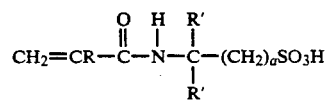

wherein
R=H or CH$_3$
R'=CH$_3$ or C$_2$H$_5$, and each R' can be alike or different
a=an integer from 1 to 4.

2. The insulated conductor of claim 1 wherein component (b) is 2-acrylamido-2-methylpropane-sulfonic acid.

3. The insulated conductor of claim 1 wherein component (a) is a high-pressure homopolymer of ethylene; a copolymer of ethylene and an alpha-olefin having 3 to 12 carbon atoms; an ethylene/ethyl acrylate copolymer; an ethylene/ethyl acrylate/hydrolyzable silane terpolymer; or an ethylene/ethyl acrylate copolymer having a hydrolyzable silane grafted thereto.

4. The insulated conductor of claim 1 wherein a major proportion of component (a) is based on ethylene.

5. The insulated conductor of claim 1 wherein component (a) is crosslinked.

6. The insulated conductor of claim 1 wherein component (a) is a blend of an ethylene/ hydrolyzable silane copolymer and an ethylene/ethyl acrylate/hydrolyzable silane terpolymer.

7. The insulated conductor of claim 1 wherein component (b) is present in an amount of about 0.1 to about 4 parts by weight per 100 parts by weight of component (a) resin.

8. The insulated conductor of claim 7 wherein component (b) is present in an amount of about 0.25 to about 2 parts by weight.

* * * * *